United States Patent
McDonald et al.

[11] Patent Number: 5,880,443
[45] Date of Patent: *Mar. 9, 1999

[54] AUTOMATED SYSTEM FOR SELECTING PACKAGES FROM A CYLINDRICAL STORAGE AREA

[75] Inventors: Sean C. McDonald, Pittsburgh; Russell E. Myers, Upper St. Clair; Manoj K. Wangu, Wexford, all of Pa.

[73] Assignee: Automated Healthcare, Pittsburgh, Pa.

[ * ] Notice: The term of this patent shall not extend beyond the expiration date of Pat. No. 5,468,110.

[21] Appl. No.: 779,918

[22] Filed: Jan. 7, 1997

Related U.S. Application Data

[63] Continuation-in-part of Ser. No. 452,646, May 25, 1995, Pat. No. 5,593,267, which is a continuation-in-part of Ser. No. 295,495, Aug. 25, 1994, Pat. No. 5,468,110, which is a continuation-in-part of Ser. No. 871,832, Apr. 21, 1992, abandoned, which is a continuation-in-part of Ser. No. 469,217, Jan. 24, 1990, abandoned.

[51] Int. Cl.$^6$ .......................... G06K 15/00; G06F 17/60; G06F 17/00; B65G 1/00
[52] U.S. Cl. .......................... 235/375; 235/383; 235/385; 235/375; 414/277; 414/278; 414/280; 198/347.2; 209/583
[58] Field of Search .................................. 235/383, 385, 235/462, 375; 414/277, 278, 280; 198/347.1, 347.2; 209/583

[56] References Cited

U.S. PATENT DOCUMENTS

| | | | |
|---|---|---|---|
| 3,802,580 | 4/1974 | Castaldi | 414/280 |
| 3,986,612 | 10/1976 | Kamm et al. | 209/111.7 |
| 4,546,901 | 10/1985 | Butarazzi | 414/280 |
| 4,651,863 | 3/1987 | Reuter et al. | 414/280 |
| 4,669,047 | 5/1987 | Chucta | 414/331 |
| 4,678,390 | 7/1987 | Bonneton et al. | 414/282 |
| 4,786,229 | 11/1988 | Henderson | 414/273 |
| 4,789,295 | 12/1988 | Boucher, Jr. et al. | 414/280 |
| 4,792,270 | 12/1988 | Yoshida | 414/273 |
| 4,812,629 | 3/1989 | O'Neil et al. | 414/274 |
| 4,814,592 | 3/1989 | Bradt et al. | 235/385 |
| 4,820,109 | 4/1989 | Witt | 414/282 |
| 4,896,024 | 1/1990 | Morello et al. | 414/274 |
| 5,129,777 | 7/1992 | Pohjonen et al. | 414/280 |
| 5,468,110 | 11/1995 | McDonald et al. | 414/273 |

FOREIGN PATENT DOCUMENTS

| | | | |
|---|---|---|---|
| 2 596 299 | 10/1987 | France . | |
| 304 | 1/1979 | WIPO | 414/273 |
| FR85/00232 | 8/1984 | WIPO . | |

*Primary Examiner*—Donald T. Hajec
*Assistant Examiner*—Jacob Eisenberg
*Attorney, Agent, or Firm*—Buchannan Ingersoll, P.C.

[57] ABSTRACT

A system for filling orders, such as prescriptions for patients, having a generally cylindrical storage area for holding packages in known locations. Each location has a unique (r,θ,Y) coordinate. The system also has a computer controlled device for picking packages from selected locations in the storage area. The picker can also be provided with a sensor for detecting rods which hold the packages and relaying the coordinates of the selected locations to the control system. The system may also include a conveyor and a transfer device from the storage area to the conveyor. The picking device deposits the picked packages in the transfer device which directs the packages into a tray on the conveyor. In one embodiment, the contents of each package is a single dosage of medicine.

34 Claims, 12 Drawing Sheets

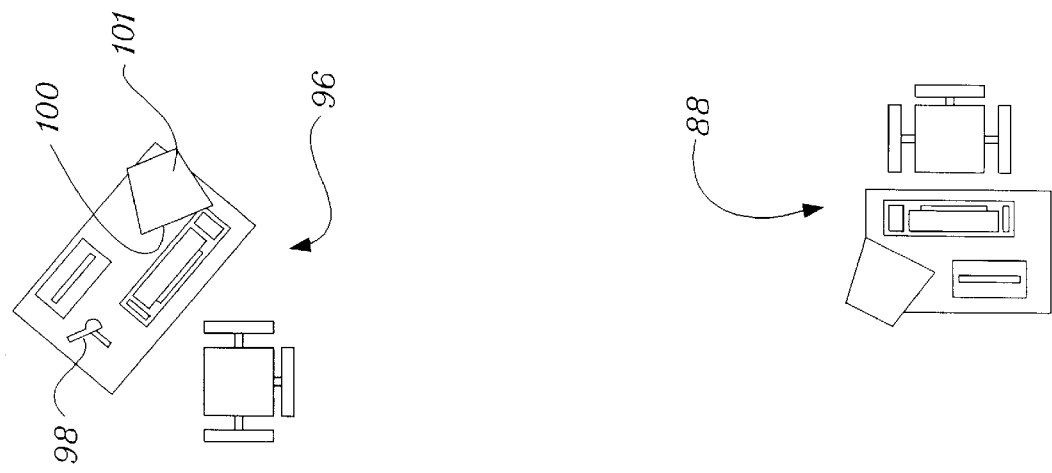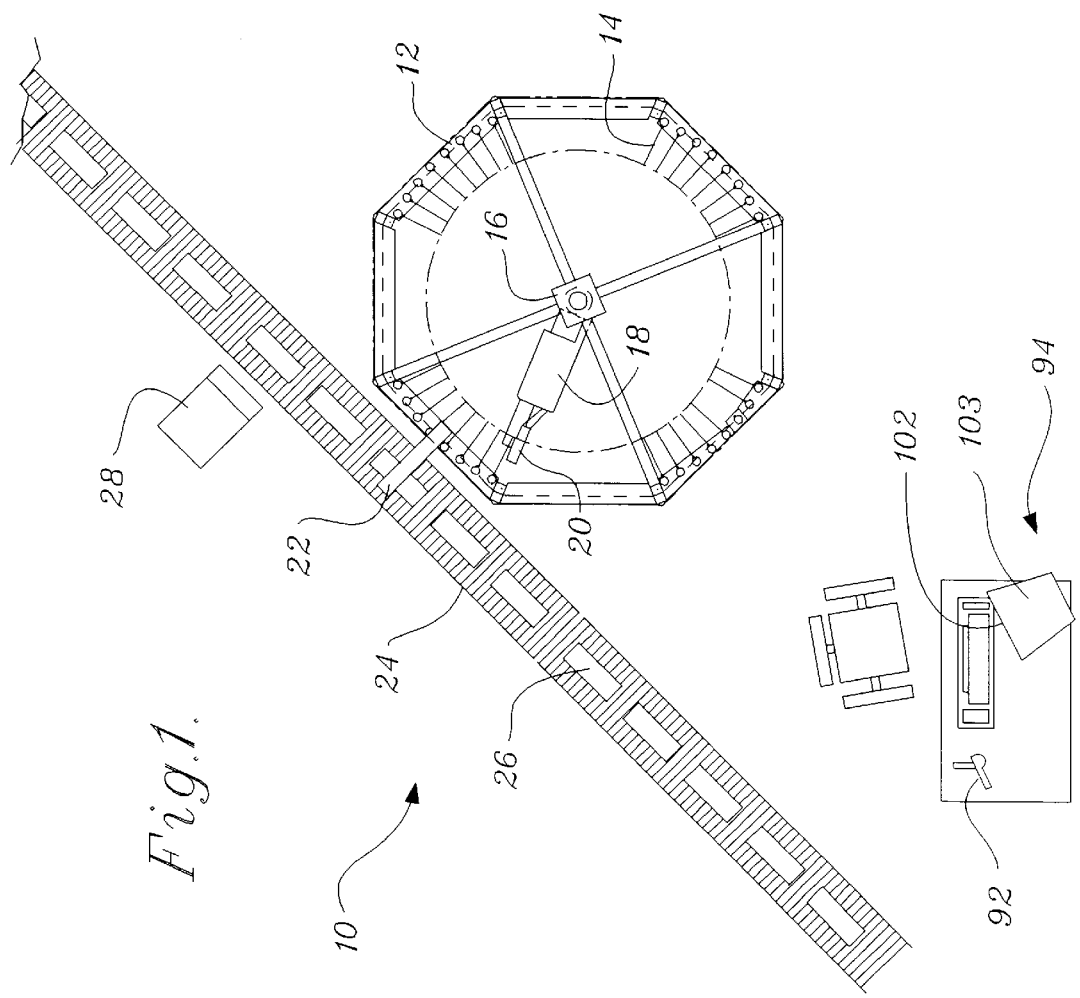

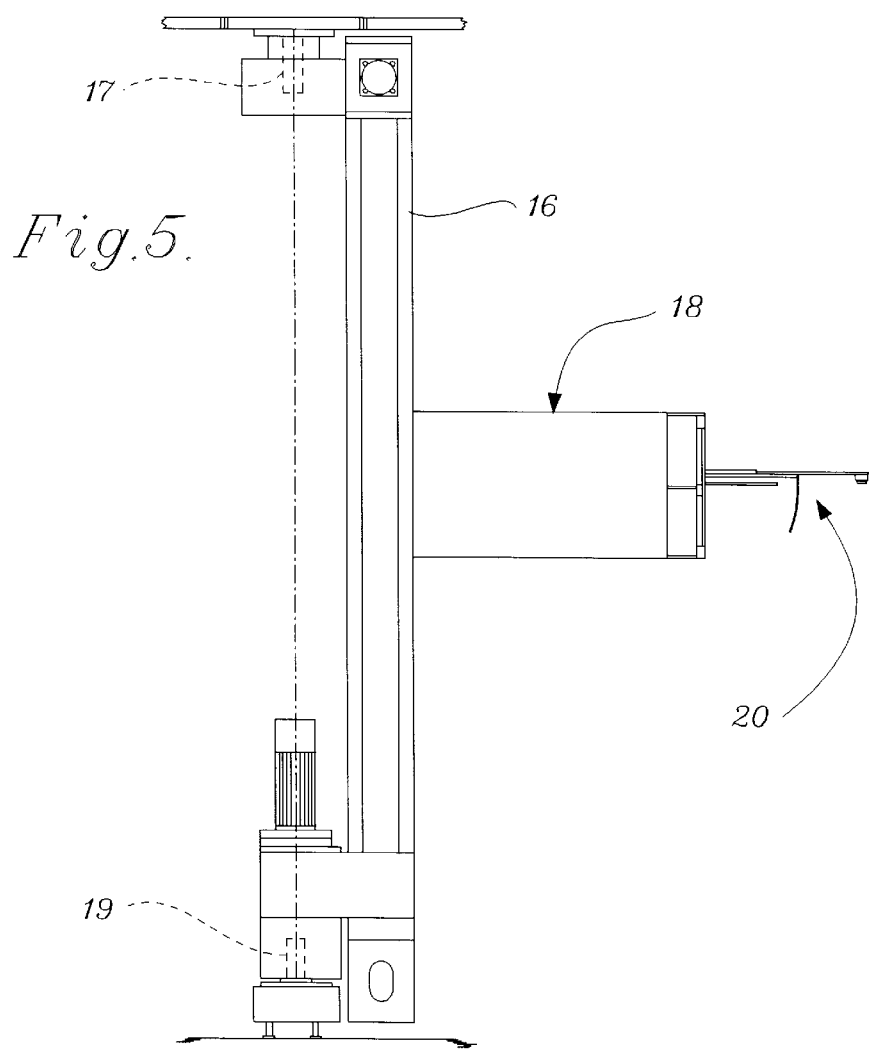
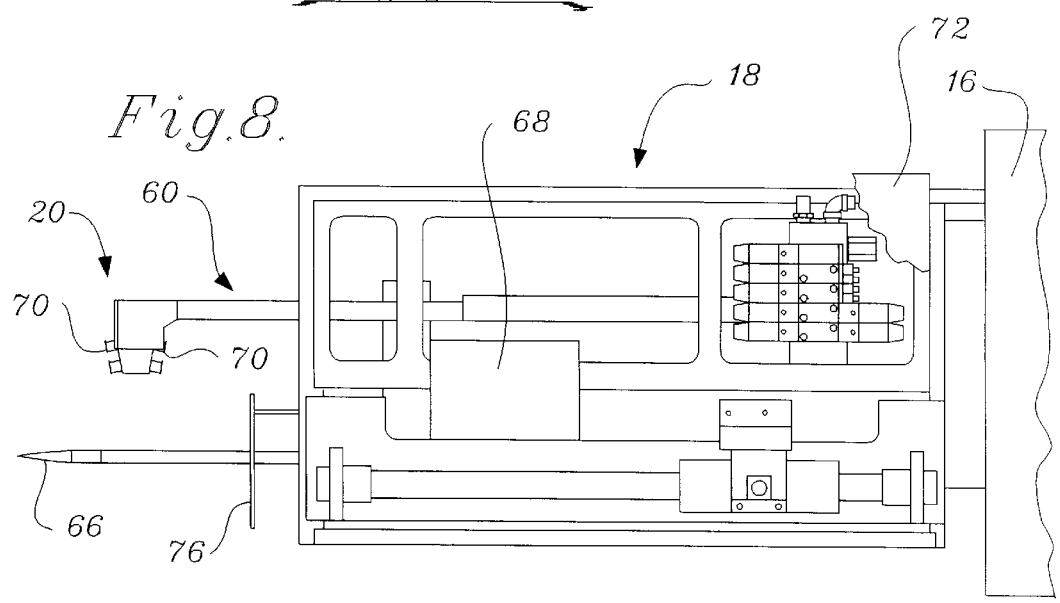

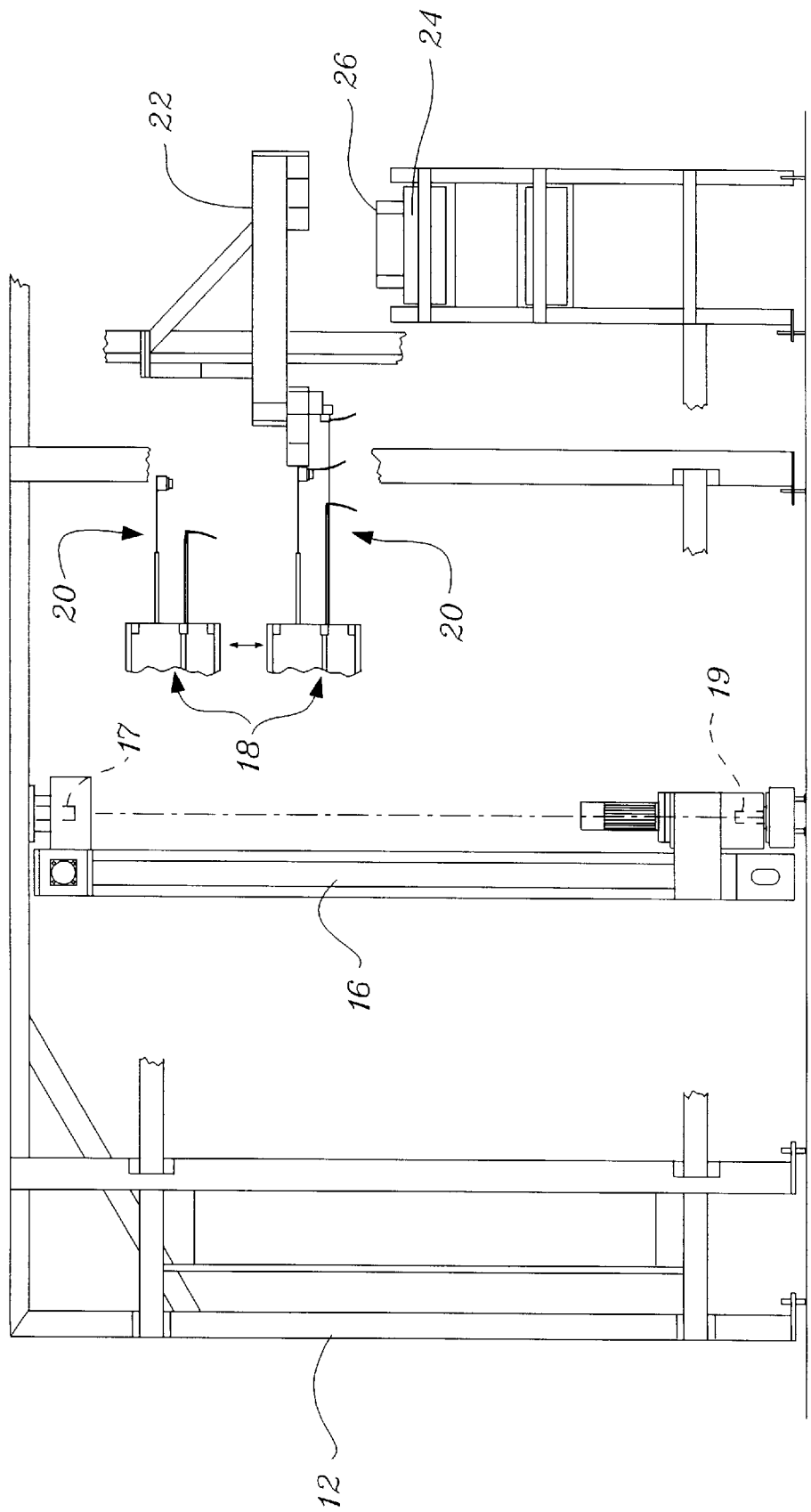

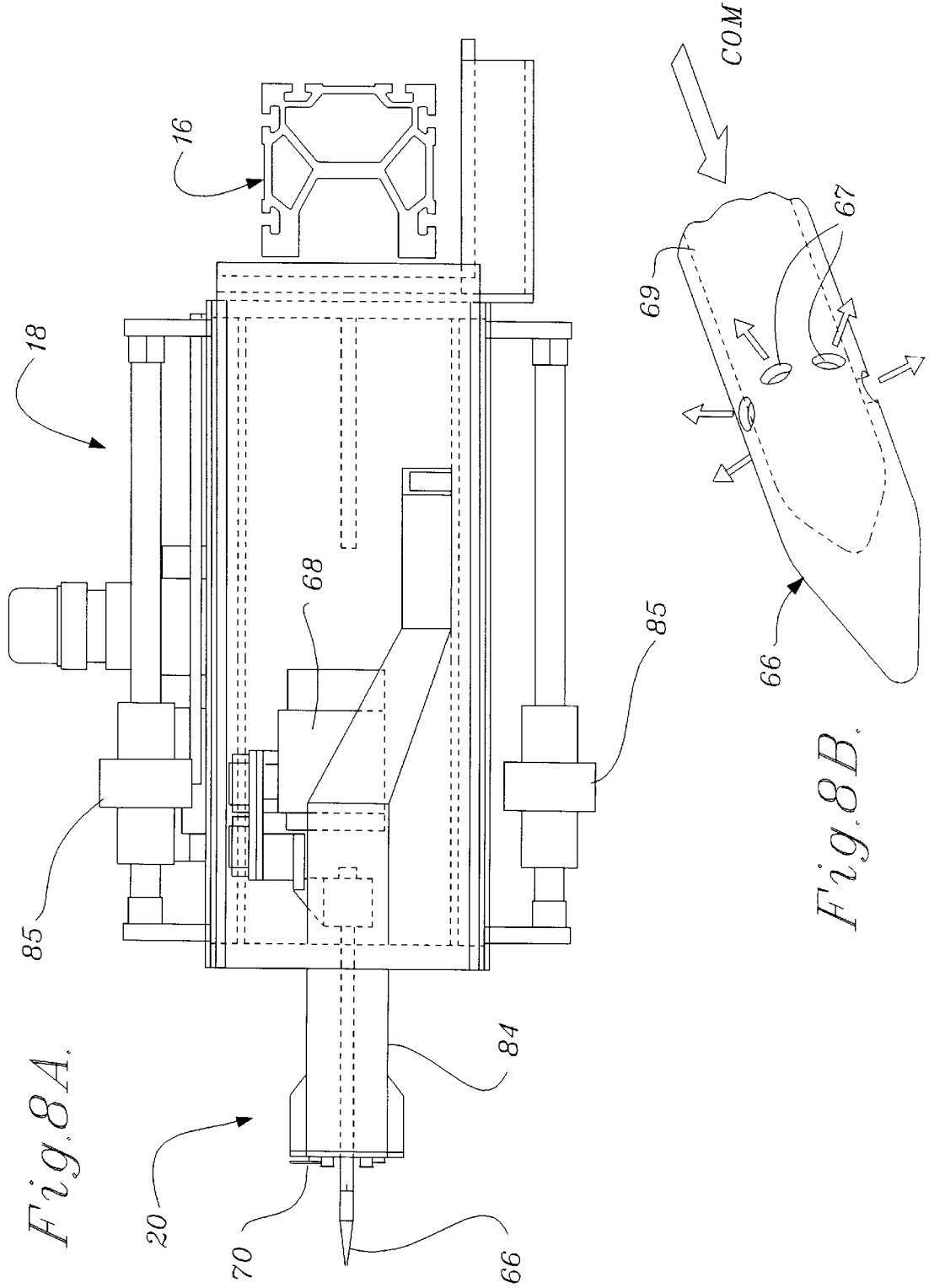

AUTOMATED SYSTEM FOR SELECTING PACKAGES FROM A CYLINDRICAL STORAGE AREA

RELATED APPLICATION

This is a continuation-in-part of co-pending U.S. patent application Ser. No. 452,646, filed May 25, 1995, U.S. Pat. No. 5,593,267 which is a continuation-in-part of Ser. No. 295,495, filed Aug. 25, 1994, now U.S. Pat. No. 5,468,110 which is a continuation-in-part of Ser. No. 871,832, filed Apr. 21, 1992, now abandoned, which is a continuation-in-part of U.S. patent application Ser. No. 469,217, filed Jan. 24, 1990, now abandoned.

BACKGROUND OF THE INVENTION

1. Field of the Invention

The present invention relates to an automated system for selecting stored articles. One embodiment of the present invention is an automated system for filling prescriptions and restocking medicines in a pharmacy.

2. Description of Related Art

Many industries store products or parts in a storeroom or storage area and repeatedly select some of the stored items to fill orders or for other uses. Such items may range from small electronic components used by a manufacturer of electronic devices to automotive parts, which vary in size, used by service departments of automobile dealerships. Usually one or more people are employed to retrieve the requested items and to restock new and returned items. These individuals may also be required to confirm that the requested items are compatible with one another and with previously supplied items. If the supplied items are to be billed to a customer or charged to particular internal accounts, the list of items is first written by the requester, and rewritten or entered into a computer database by the storeroom attendant to create an invoice, supply list or other document. In some instances, further generations of the list are made by installers, users or billing clerks. Such methods have built-in opportunities for mistakes every time a list is rewritten and are less efficient than automated systems. Moreover, as labor costs rise and the size of inventory needed to be stored expands, the conventional storeroom and parts department become more and more expensive.

Some businesses have attempted to control costs by limiting inventory through standardization of parts. But such limits are not possible or desirable in some industries, particularly in a hospital pharmacy.

Currently, in large hospital environments, doctors visit patients in nursing units and write out medication orders for each patient. A patient is typically placed on a certain medication which may require multiple doses of medication be administered over a period of a day. Some medications are administered at certain times of the day and possibly at intervals of several hours. Patients may also request certain medications on an elective basis for disorders such as headaches. These requests are included in the doctor's order that is sent from the nursing unit to the central pharmacy of the hospital.

Once an order is received by the pharmacy, it is checked by registered pharmacists and input into the pharmacy information system. These orders reflect not only orders that are added to a particular patient's treatment, but changes in the medication treatment. The pharmacy information system combines this information with the patient's existing medication schedule and develops a patient medication profile. A fill list is generated from that profile. The fill list is a list of all the medications that must be distributed to all patients for the day. This information is sent to the pharmacy printer where a hard copy is generated. Frequently, that hard copy or a copy thereof is sent to the billing department so that the medication can be charged to the patient or his insurer.

At this point, the drugs for a particular patient are hand-picked by either a pharmacist or a pharmacy technician and placed in the particular patient's designated box. A registered pharmacist must then check the accuracy of the patient order before it leaves the pharmacy. Individual patient boxes are then loaded into a large cassette and delivered to the nursing unit.

Approximately 30% of the drugs dispensed each day are returned to the pharmacy unused. Since each drug is individually packaged, the drugs must be returned to the pharmacy stock. Patients are then credited for unused medication. This return and crediting process is a very time-consuming task and requires a significant amount of pharmacy manpower.

In a typical large pharmacy, up to 35 pharmacists and pharmacy technicians are responsible for all aspects of the unit dose dispensing task. Because this process is done manually, a certain amount of error occurs. Studies have estimated that a half-percent error rate is typical in a large hospital. Since a hospital may dispense over 6,000 doses each day, this error rate leads to a significant number of missed or incorrect doses.

Several companies have tried to automate this process through various approaches to the problem. Meditrol utilizes a vending machine approach to dispense the unit dose medications. Each nursing unit must have its own stock of prescription drugs. Nurses key in a patient ID and the drugs for that patient are then dispensed from the vending machine. This system is very expensive because of the necessity of purchasing a machine for each nursing unit. Also, restocking each machine is a very time-consuming task. Implementation of this system requires a complete modification of the current drug dispensing process which many hospitals are reticent to undertake. This system claims no labor-saving advantages from its implementation. This system is covered under U.S. Pat. No. 3,917,045 titled "Drug Dispensing Apparatus" and dated Nov. 11, 1975.

Baxter Travenol offers a dispensing system from Samsung, a Korean company, which dispenses bulk solids into a package which is dispensed to the pharmacist. This system only dispenses the 200 most frequently used solids. A typical hospital pharmacy can contain over 1,500 different medications, many in liquid, syringe or bottle form. These medications cannot be automatically dispensed by this system, but must be manually selected by the pharmacist.

Neither system allows the dispensed medications to be automatically returned to the storage area. Thus, there is a need for an automated system which is able to dispense all dosage forms currently contained in a hospital pharmacy. Medicines should be automatically dispensed by the system per a patient order and placed in individual patient medication boxes for a pharmacist to check. Each drug and each patient box should be individually bar coded so that the accuracy of the dispensing process can be automatically checked by the system. Once drugs are returned to the pharmacy, the system should automatically return each drug to its proper location in inventory and credit the patient's account for the return. One system should also keep a running inventory and notify the user whenever inventory of a particular item drops below a preset level and whether the shelf life of an item has passed. With such a system, a hospital can recognize significant labor savings, as well as savings based on improved accuracy in the dispensing function and better tracking of inventory and expired medications.

In U.S. Pat. No. 5,468,110 which issued from a parent application there is disclosed an automated pharmacy system in which a robot picks unit dose packages from a straight track. This system has worked well in hospitals where a large room is available. However, in hospitals where no large rooms are available it is necessary to remove walls or build an addition to have this automated pharmacy. Additionally, the system may be an ideal solution for smaller hospitals who want to lower their distribution costs. Consequently, there is a need for a compact automated package dispensing system.

SUMMARY OF THE INVENTION

We provide an automated method and apparatus for selecting and restocking items stored in a generally cylindrical storage area. This method is particularly useful for filling patient medication orders in a hospital pharmacy. The stored items must be packaged to be held in a storage rack. Preferably, each package contains a bar code corresponding to the package contents. The items are arranged in a main storage rack so that like items are in the same location and a predetermined location is provided for every item.

We prefer to provide a second rack or a designated, preferably moveable portion of the main storage rack for receipt of new or returned items to be restocked. Such items can be randomly placed on this supply station for transmittal to their respective predetermined locations on the storage rack.

We also provide a means for picking items from and placing items in the storage rack and the supply station. The automated picker preferably is comprised of a gripper assembly mounted on a transport vehicle which moves vertically along a column which can rotate 360 degrees. The gripper assembly has a movable rod or other carrier for holding selected items, at least one vacuum head, and associated controls for gripping and moving selected items. We prefer to provide a bar code reader for reading item packages.

We also prefer to provide a conveyor on which boxes, patient medication trays or drawers can be placed. The conveyor is positioned adjacent to the storage area and a transfer device is provided from the storage area out to the conveyor so that the automated picker can place selected items on the transfer device which directs the items into the appropriate container on the conveyor.

We provide a processing unit with associated memory and data entry peripherals. This computer system receives the list of requested items, directs the automated picker, checks the items selected and prepares reports. Data can be entered manually through a keyboard or bar code reader or electronically through a communication port. Reports may be printed, displayed on a console or transmitted to a memory or another computer for later use.

Other details and advantages of our method and apparatus will become apparent from the description of the preferred embodiments shown in the drawings.

BRIEF DESCRIPTION OF THE DRAWINGS

In the accompanying drawings, the preferred embodiments of the invention and preferred methods of practicing the invention are illustrated in which:

FIG. 1 is a schematic representation of our present preferred system;

FIG. 5 is an elevation view of our present preferred system;

FIG. 6 is an elevation view of our present preferred system illustrating a package transfer device;

FIG. 8 is a detailed side view of a present preferred automated picker and gripper assembly;

FIG. 8A is a detailed plan view of the automated picker and gripper assembly of FIG. 6;

FIG. 8B is a perspective view of a cut away section of an alternative embodiment for the tip of the automated picker shown in FIG. 8;

DESCRIPTION OF THE PREFERRED EMBODIMENT

Figure 3:
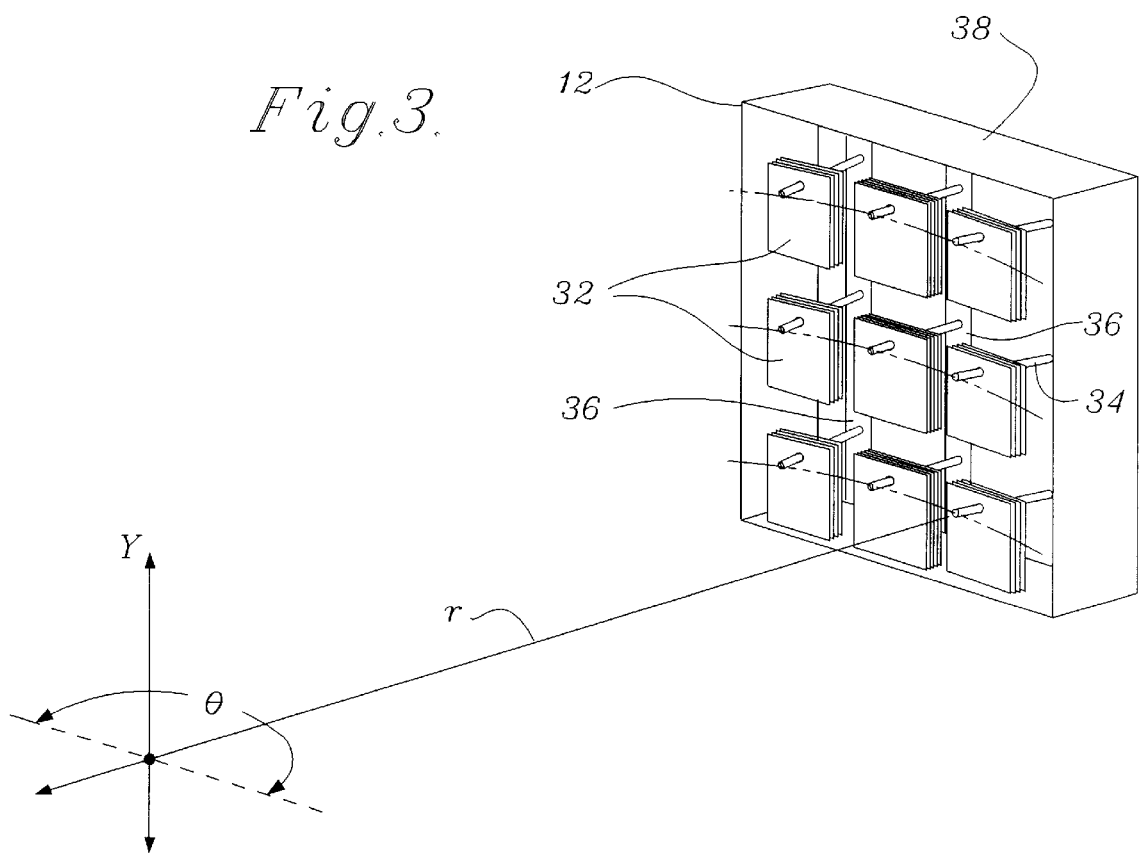
FIG. 3 is a perspective view of a first type of preferred storage rack.
Figure 3A:
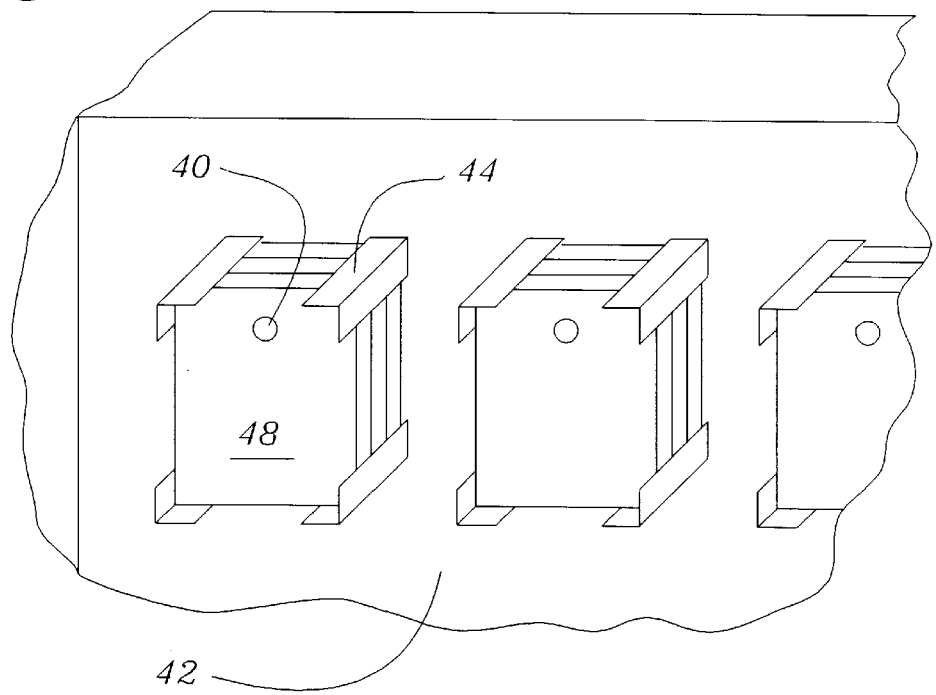
FIG. 3A is a perspective view of a portion of a second type of preferred storage rack.
Figure 3B:
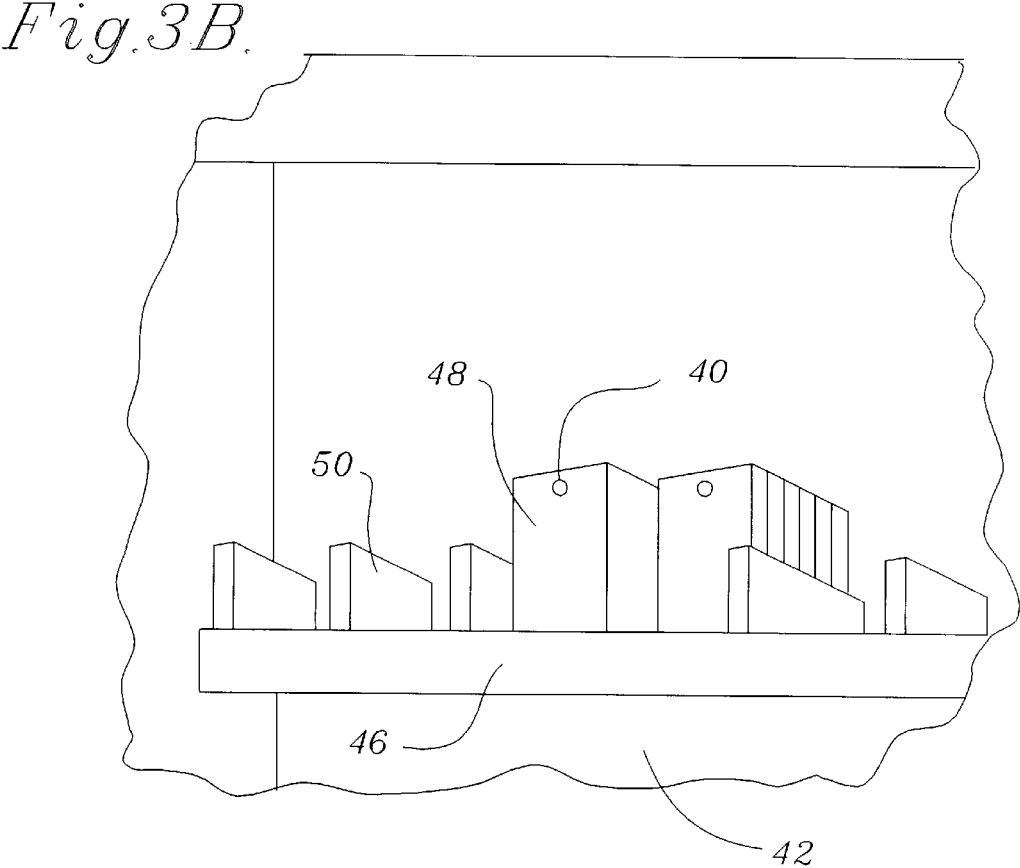
FIG. 3B is a perspective view of a portion of a third type of preferred storage rack.

Referring now to the drawings wherein like reference numerals refer to similar or identical parts throughout the several views, and more specifically to FIG. 1 thereof, there is shown a schematic representation of a present preferred system 10 for filling orders, such as prescriptions for patients. The system 10 contains storage racks 12 for holding packages and automated picker 18 for selecting and restocking packages. The storage racks 12 are adjacent to each other and form a generally cylindrical shape. Various storage rack designs can be used and certain present preferred storage racks are shown in FIGS. 3, 3A and 3B.

Figure 2:
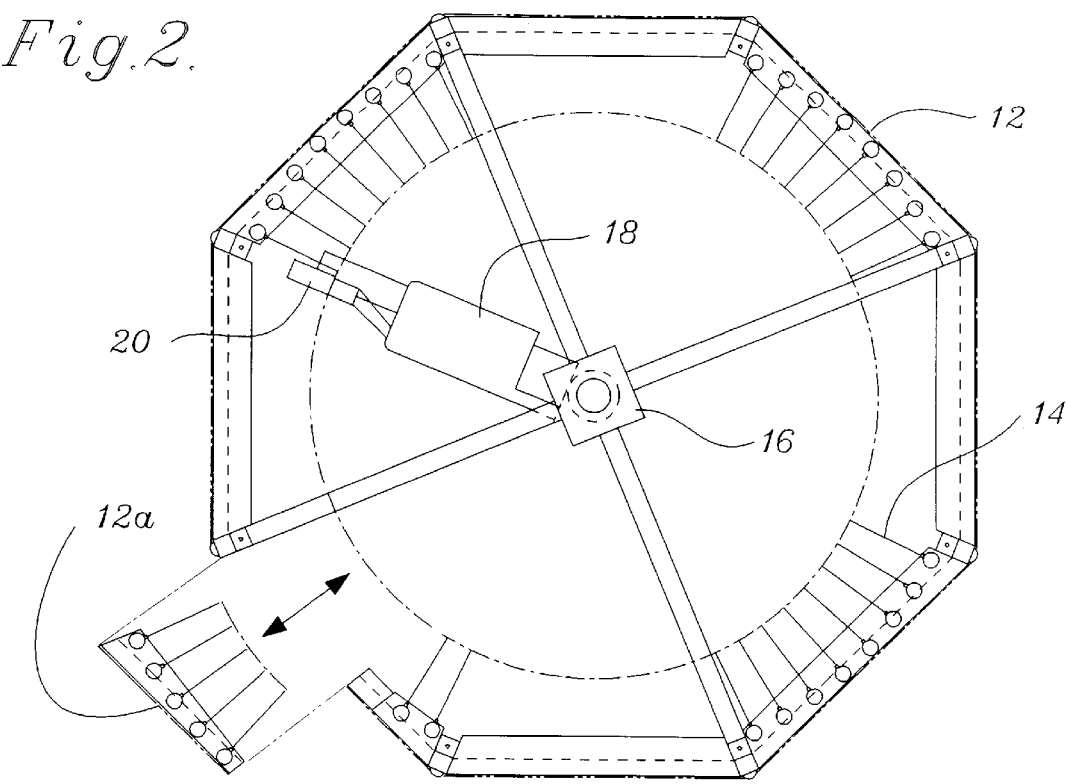
FIG. 2 is a top view illustrating a removable storage structure.
Figure 2A:
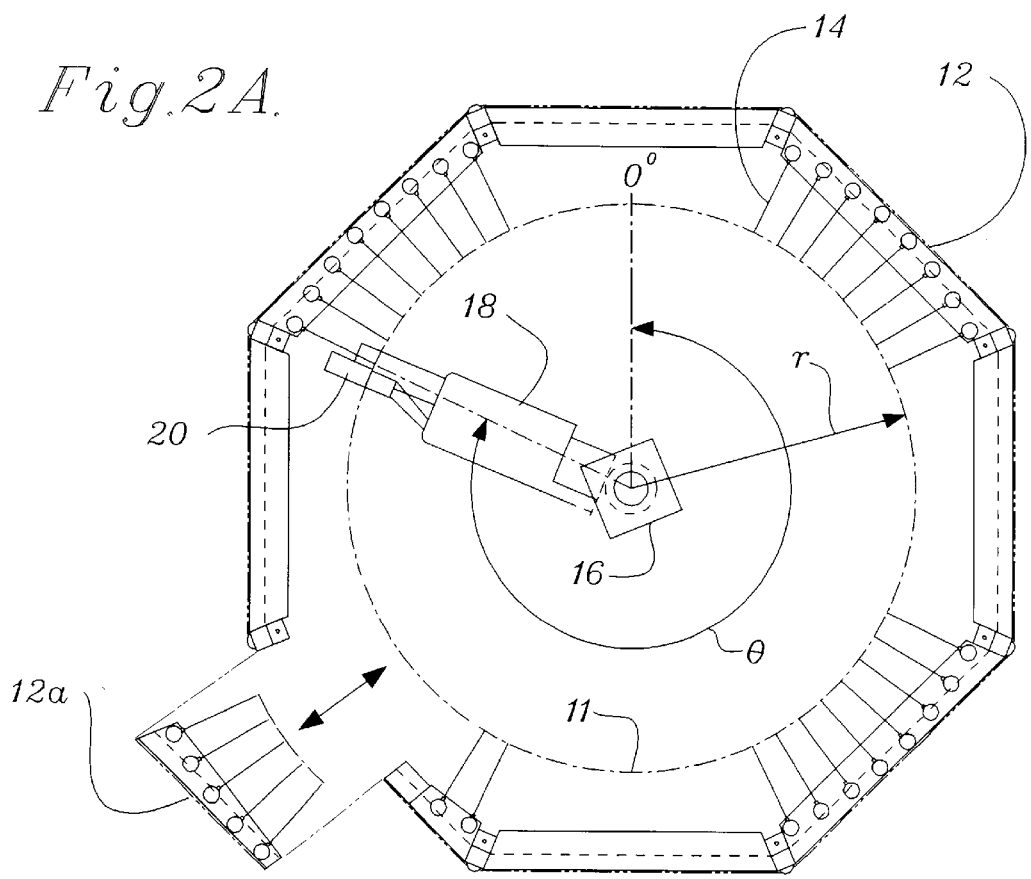
FIG. 2A is a top view illustrating the radial coordinate system.

We prefer that one of the storage racks 12a be removable for use as a supply station as shown in FIG. 2. The system is stacked by removing the rack 12a and manually placing new supplies at selected positions. The rack is returned to its original position. Then the picker 18 removes the new packages and places them in assigned locations. As shown in FIG. 3, each rack 12 has a trapezoidal or rectangular support structure 38, having an open front and back. Running up and down the back are a plurality of back rod supports 36 from which the rods 34 extend. The support structure 38 with rods 34 form an (r,θ,Y) coordinate system with each rod 34 and medicine packages 32 thereon having a unique (r,θ,Y) coordinate. The radial coordinate system is shown most clearly in FIG. 2A. The ends of the storage rods are positioned along circumference 11 and have distinct coordinates defined by the radius "r," the angle θ, measured from a preselected zero degree reference point, and vertical location Y. Packages are placed in the storage rack so that each product is located at a known (r,θ,Y) coordinate. Since every product is has a known (r,θ,Y) location, it is possible to direct an automatic picker to any product location to select a desired item. The packages are segregated within the storage rack so that all packages in any given location have the same contents.

Although we prefer to use racks in which packages are hung on rods, other types of racks can be used for storage racks and supply stations in our system. In FIG. 3A, we show the upper portion of a rack having a support structure with an open front and closed back 42. Attached to the back 42 are sets of brackets 44 positioned to hold packages 48. To be held securely in this rack, such packages must be fairly rigid. Blister cards and boxes can be used. If desired, a hole 40 could be provided in the packages to permit them to be carried on a rod. A top portion of another suitable rack having an open front and closed back 42 is shown in FIG. 3B. This rack has a set of shelves 46, which may be inclined toward back 42. A set of dividers 50 separates groups of packages 48. The racks of FIGS. 3, 3A, and 3B have some common features. First, the packages are held in locations having known (r,θ,Y) coordinates. Those coordinates could be single (r,θ,Y) values as may correspond to the position of the package holes 40 or a group of (r,θ,Y) values defining an entire package. Second, there is sufficient clearance between packages to allow automated picker to select, grab and replace individual packages.

Figure 4:
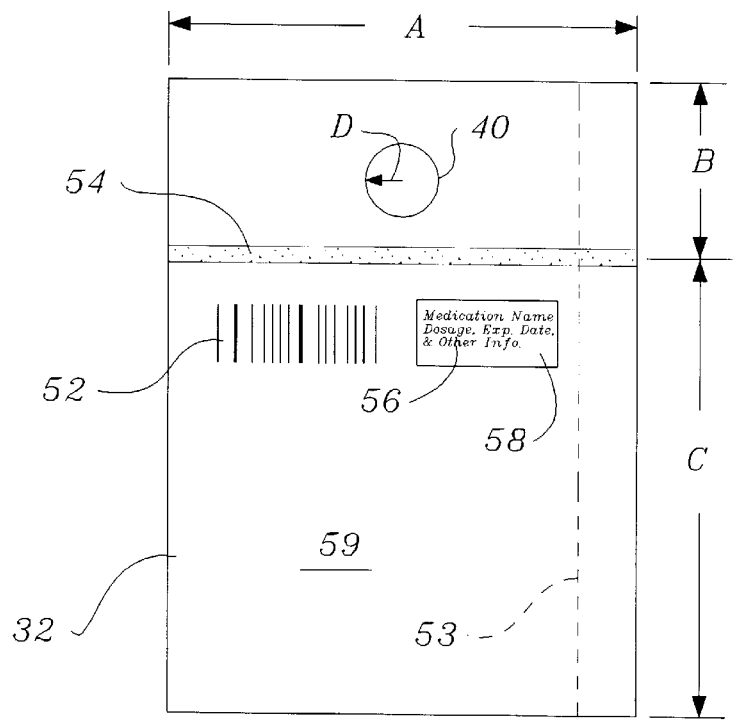
FIG. 4 illustrates a present preferred package.

In our system, each package preferably contains only one product, although the product may consist of two or more related items, such as nut and bolt. When installed in a hospital pharmacy, each package preferably contains a single dose of medicine. A present preferred package 32 is illustrated in FIG. 4. Although the package could be a blister card or box, we prefer to use a clear plastic bag having a hole 40 to permit the package to be hung on a rod 34 or 66, shown in FIGS. 3 and 7–9. Each package preferably has a bar code 52 and a written description 56, which identify the contents of the package. A white area 58 can be created on the clear plastic bag over which the written description 56 can be printed, stamped or even handwritten. The bar code and the written description may include not only the name of the product, but also its quantity, weight, instructions for use and expiration date. FIG. 5 represents a clear plastic bag for a unit dose of medicine. We can use a bag having a perforation line 53 for easy opening or a recloseable bag having an interlocking rib type seal 54, or both, as shown in FIG. 4. This type of bag is useful in a hospital pharmacy which buys medicines in large or bulk quantities and must repackage the drugs in individual dose packages. Package 32 can be any desired size. We have used a rectangular package having dimensions indicated by arrows A, B, C and D, wherein A is 3.5 inches, B is 1.0 inch, C is 3.0 inches and D is 0.1875 inches. Alternatively, the package 32 can have A equal 5.0 inches, B equal 1.25 inches, C equal 5.0 inches and D equal 0.1875 inches.

Figure 7:
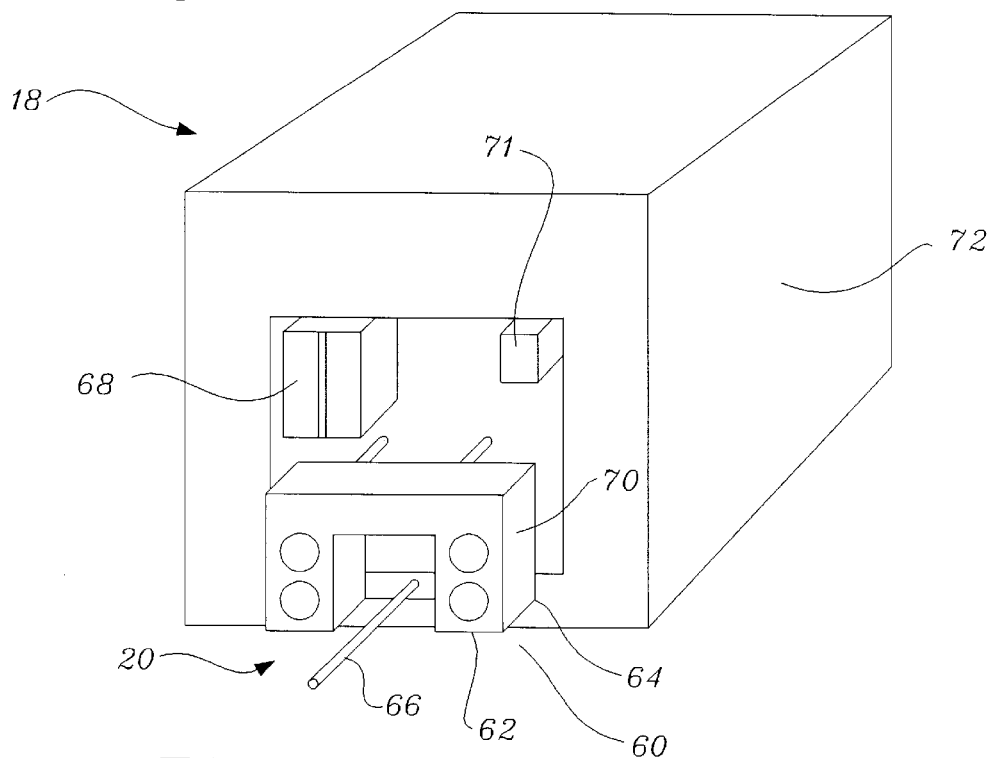
FIG. 7 is a schematic view of a present preferred gripper assembly.

Referring now to FIG. 5 and 6, we provide a column 16 along which the automated picker 18 travels vertically. Many types of drive systems could be used to propel the automated picker 18. Whatever drive system is used should be capable of moving the automated picker 18 vertically in a controlled manner to positions along the column which correspond to the Y coordinates of the packages within the rack. The column 16 is mounted to upper pivot 17 and lower pivot 19 which permits the column 16, and an automated picker 18, to rotate 360 degrees to select packages 32, preferably of the type illustrated in FIGS. 3–4. The automated picker 18 is controlled by a computer 88 and may be connected to a local area network of computers, having a database. The database has the order to be filled and a record of the predetermined locations of each different product in the storage racks 12. The computer 88 guides the automated picker 18 based on information contained in the database, such that the automated picker 18 picks packages 32 according to the order to be filled. The automated picker 18 can also include means, such as a bar code reader 68, as shown in FIGS. 7–8A, for determining the identity 52 of a package 32, or package 48 as shown in FIGS. 3A and 3B, in the storage racks 12, or in a removable storage rack 12A, and providing its identity 52 to the computer 88. The computer 88 guides the automated picker 18 to select the desired packages 32 and deliver them to a package transfer device 22 which deposits them into containers 26 on conveyor 24, shown most clearly in FIG. 6. When the system is installed in a hospital pharmacy, the containers 26 are individual patient boxes in which the patient's medication is delivered from the pharmacy to the appropriate floor or nurses' station. The patient boxes 26 preferably are bar coded with a patient identification code. After a patient's order is filled and the patient box 26 has all the medicine packages called for in the order, a conveyor 24 moves the patient box 26 to a check station 94. An operator uses the check station bar code reader 92 to scan the bar code label on the filled patient box 26, as shown in FIG. 1. The patient identification number is taken from the inputted bar code and the order of the patient is displayed on the check station screen 102 of the check station console 103 connected to the computer or network of computers 88. The operator then scans individual medicine package bar codes in the patient box 26. The medicine packages 32 in the patient box 26 are automatically checked for correctness with respect to the patient list on the station screen 102. If the medicine packages 32 in the box 26 are correct, then the patient box is allowed to continue on towards the ultimate destination and the next filled patient box 26 is then checked. If the medicine packages 32 in the patient box 26 are not correct, then it is determined whether the error, whatever that may be, can be corrected. If the correction can be made, then the record on the check station screen 102 is corrected and the procedure for verifying correctness is then repeated. If the problem cannot be corrected, then the patient box 26 can be manually filled or resubmitted to be filled with missing doses by the system and the computer is notified that the patient's order has not yet been filled.

In the event that a patient does not take all of the medicine which has been prescribed, unused medicine is returned to the hospital pharmacy in the patient box 26. Typically, patient boxes are transferred in a carrier which contains several patient boxes. This carrier is received at a return station 96, as shown in FIG. 1. The patient box 26 is first removed from the carrier returned from a nursing unit. An operator uses the return station bar code scanner 98 to scan the bar code on the patient box 26. The nursing unit number and the patient identification number is then parsed from the inputted bar code of the patient box 26. The database is then accessed and the patient dispensing record is retrieved. On the return screen 100, there is displayed for a particular patient at the operator console 101, a list of the medicines ordered and dispensed to the patient. The operator of the return station 96 then scans the identity 52 of the medicine in the patients box 26 with the return station bar code scanner 98. The medicine packages 32 that are found thereon are verified as being dispensed to the patients. The expiration date of the medicine in the medicine package 32 is then determined. If the expiration date of a medicine in the medicine package 32 has passed, then the medicine package is discarded. If the expiration date has not passed, then the returned medicine package 32 is placed in the removable storage rack 12a. If there is more medicine to be returned, the process is then repeated. If there is no more medicine in the patient box 26 to return, then the return station console 101 is checked to verify the correctness of the medicine returned. If the screen is correct, then the return record is accepted and the database is updated. If the screen 100 is incorrect, then the screen is corrected to correspond to the returned medicine packages 32 and the patient box 26. In this manner, the system will have developed a record of all medication given to each patient. That record can be transferred to a hospital billing system and used for billing purposes. The data can also be input into an inventory monitoring system and used to generate reports or orders for new supplies.

Since storage rack 12a is removable we can provide additional supply racks not shown in a holding area for returned and new products. When filled these additional racks are substituted into the system. These added storage racks 12a are accessed by the automated picker 18 in the same manner as regular storage racks 12. When packages 32 are to be restocked, the removable storage rack 12a, which has been filled with new, or returned, packages is placed in the system as shown in FIG. 2. By being placed in a predetermined position, the (r,θ,Y) coordinates at which packages have been placed in the removable storage rack 12a are known to the computer 88. The automated picker 18 is then positioned for a chosen package. The bar code reader 68 of the automated picker 18 then scans the identity 52 of the package 32 that is about to be picked. The process of picking the returned packages 32 is the same as occurs with respect to the process of obtaining packages 32. The only difference is that the order of the packages 32 and their identity as they are picked is saved in the computer 88. When the automated picker 18 is then moved to the storage racks 12, the computer knows the identity of the respective medicine package 32 on the automated picker 18, which is about to be placed back onto the storage racks 12.

Figure 9:
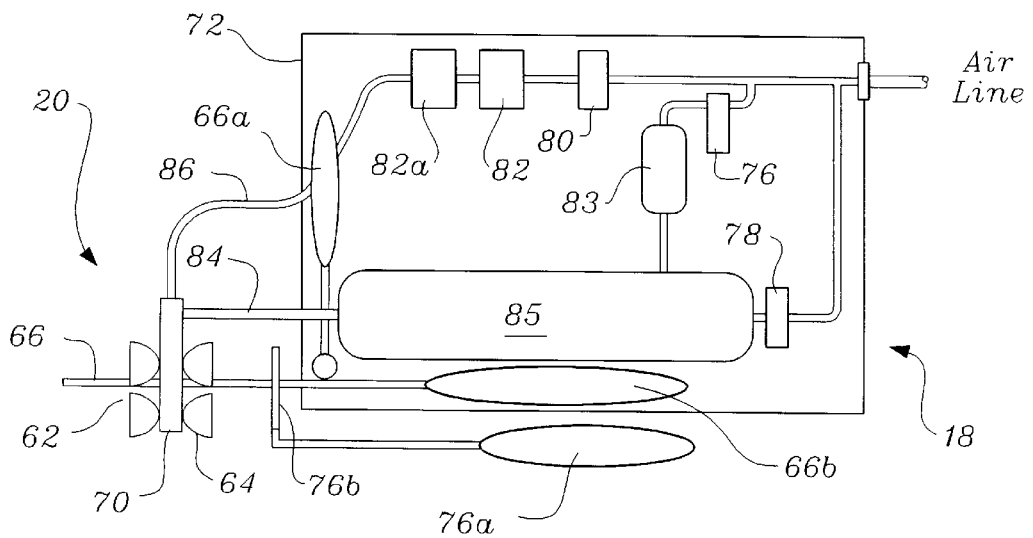
FIG. 9 is a diagram showing a preferred vacuum and pressure line for the automated picker and gripper assembly.
Figure 10:
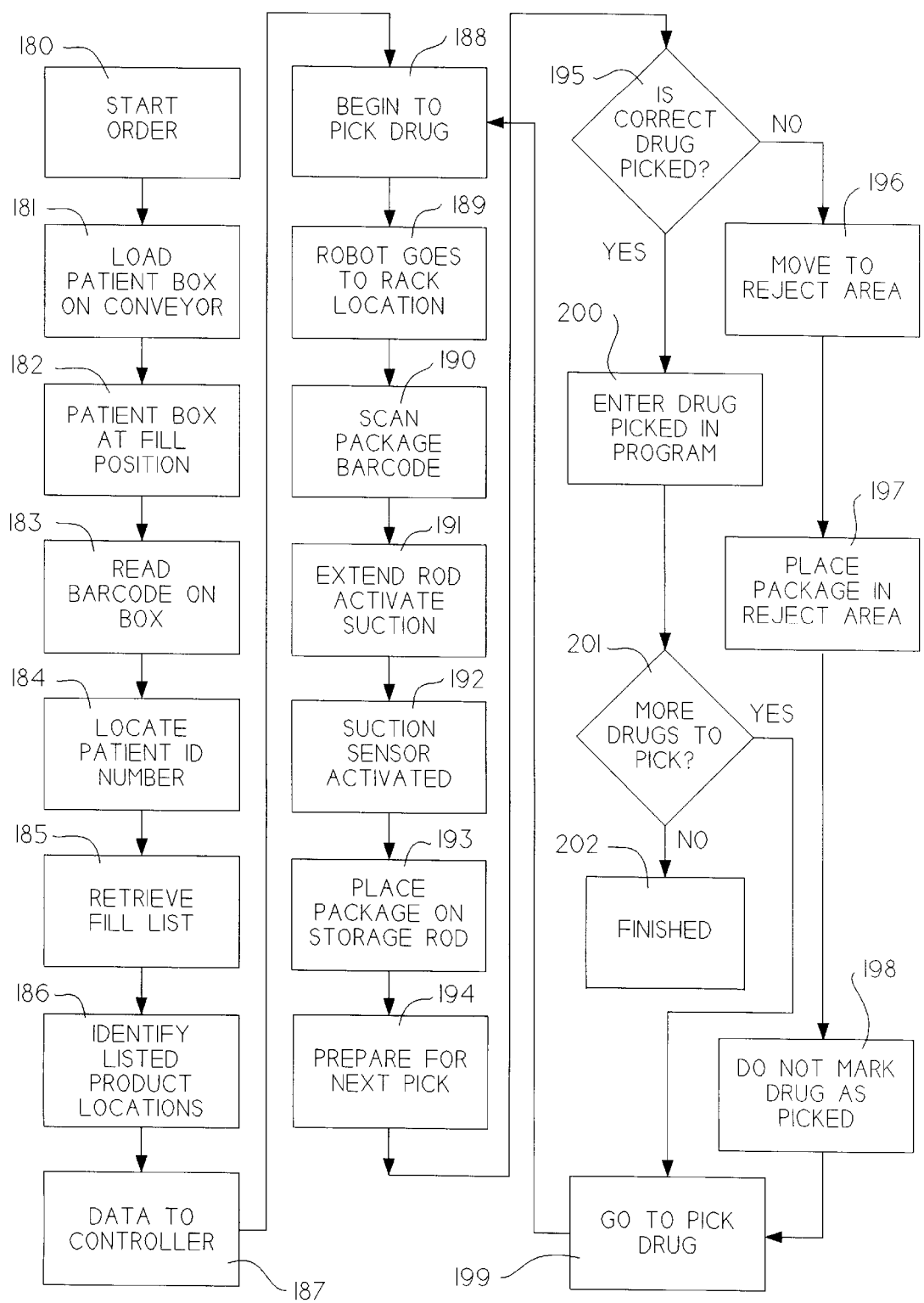
FIG. 10 is a flowchart of the filling process.

The automated picker 18 includes at least one gripper assembly 20 illustrated in FIGS. 7–9. The automated picker 18 having gripper assembly 20 is mounted on column 16, which is mounted on upper pivot 17 and lower pivot 19 which allow a 360-degree rotation of the column 16 and the automated picker 18 with gripper assembly 20. The automated picker 18 and gripper assembly 20 is preferably comprised of a housing 72, as shown in FIG. 7, having a means for storing medicine packages 32, such as a storing rod 66. The gripper assembly 20 also contains means 60 for obtaining a package 32. The obtaining means 60 is slidingly attached to the housing 72 such that it can move in the "r" direction, which is perpendicular to the Y direction, to pick a package 32 from a support rod 34 in the storage rack 12 or removable storage rack 12a. Identifying means, for example, the bar code reader 68 shown in FIGS. 7–8A, is mounted on housing 72 such that it can identify a package 32 to be picked by the obtaining means 60. The automated picker 18 is also provided with a movable storage rod sensing assembly 71 attached to the housing 72 so that it may detect the location of the tip of a storage rod 34 in r,θ, and y coordinates. As an alternative to manually measuring and inputting the coordinates of each of the storage rods 34 in the storage racks 12 into the computer, the automated picker 18 can be systematically moved throughout the storage racks 12, sensing the locations of each storage rod 34 with the sensor 71. The sensed coordinates are then transmitted to the computer 88 which stores the data for future application. We prefer to provide apertures 67 in the tip 66 of the automated picker 18. As shown in FIG. 8B, compressed air is directed through an air passage 69 formed in the storing rod 66 and exits through the apertures 67. As packages 32 are drawn onto the storing rod 66 and past the apertures 69, the air exiting the apertures 69 prevents the package from inadvertently backing off of the storing rod 66. As illustrated in FIG. 9, the obtaining means 60 preferably includes means for producing a suction, such as a vacuum generator 82 controlled by a vacuum sensor 82a which draws a vacuum through vacuum line 86 and vacuum valve 80. The obtaining means 60 also preferably includes an extension bracket 84 in fluidic communication with a pneumatic in/out cylinder 85 and associated valve 78. The extension bracket 84 is slidingly attached in the "r" direction to the housing 72. A suction is maintained through the vacuum lines 86 when the vacuum valve 80 is activated to supply air to vacuum generator 82. As shown in FIG. 10, the obtaining means 60 also can include a suction head 70 connected to the extension bracket 84 through which a package is picked with suction. The vacuum sensor 82a will sense when a package is properly positioned on the suction head 70, for example, by detecting vacuum pressure. The suction head 70 and carried package are then moved to the storing means, such as the storing rod 66, to deposit the package thereon. Preferably, the storing means is a storing rod 66 which extends from the housing 72 such that the suction head 70 and the extension bracket 84 can deposit a package 32 thereon. The storing rod 66 and cylinder 66A are attached to a servo motion drive 66B which allows the storing rod to retract and extend in reference to the obtaining means. Storing rod 66 and pusher plate 76B are also attached to a cylinder 76A which allows the plate to move in the positive "r" direction. This action is necessary to push packages 32 off of the storage bar 66 during the dump process.

The extension bracket 84 can move in the Y and "r" directions to place a picked package 32 on the storing rod 66 under the action of up/down cylinder 83 and in/out cylinder 85. Valve 76 activates cylinder 83 to move both the cylinder 85 and the extension bracket 84 in the Y direction. Valve 78 activates cylinder 85 to move the extension rod in the "r" direction. Valve 80 provides air to the vacuum generator 82 to suction in head 70 sufficient to pick a package from a rod 34 of the support structure 38 and then hold it to the suction head 70. The suction head 70 preferably has two faces 62 and 64 through which suction can be drawn. One face 62 is capable of picking a package from a rod 34 of the storage rack and the other face 64 is capable of picking a package from a storing rod 66 of the gripper assembly 20. As shown in best in FIG. 4, each package preferably has a face 59. The packages are held by the storing rod 66 and the rods 34 of the support structure 38 such that the face 59 of each package is parallel to the Y axis. The outside face 62 is utilized when a package 32 is being removed from a rod 34 in the supply rack, and the inside face 64 is utilized when a package is being removed from the storing rod 66 of the gripper assembly 20.

In the operation of the preferred embodiment in a hospital, doctors visit patients in nursing units and write out medication orders for each patient. A patient is typically placed on a certain medication treatment which requires multiple doses of medication over a period of a day. Some medications are administrated at certain times of the day and possibly at intervals of several hours. Patients may also request certain medications on an elective basis for disorders such as headaches. These requests are included in the doctor's order that is sent from the nursing unit to the central pharmacy of the hospital. Once an order is received by the pharmacy, it is checked by registered pharmacists and input into the pharmacy information system. These orders reflect not only orders that are added to a particular patient's treatment, but changes in the medication treatment. The pharmacy information system combines this information with the patients existing medication schedule and develops a patient medication profile. A fill list is generated from that profile. The fill list is a list of all the medications that must be distributed to all patients for the day. This information is sent to the pharmacy printer where a hard copy is generated.

Means for communication between the pharmacy information system and the present system exist by either tapping the serial data print stream of the pharmacy information system or by a direct bi-directional communication link. The relevant information concerning the patient, including drug type, dosage, route, frequency, and administrative instructions is placed in the database of the system. The database contains information about which drugs are to be dispensed that day to the patient and all drugs that have been dispensed in the past to the patient. Information from the pharmacy information system is received continuously. New information can be entered into the database at any time. In addition to the fill list, new orders and patient admittance, discharge and transfer information are received and stored.

FIG. 10 is a flowchart with respect to the processing of a patient order. A similar method would be followed for retrieving other stored products. The software for processing an order is started as indicated by box 180. Then the steps indicated by boxes 181 through 202 are followed. Before a box is loaded onto the conveyers, the operator scans the location bar code and the patient bar code on the patient box. The system then checks its database to ensure that that patient is still at that location. If a new patient has been transferred or admitted to that location, the system automatically generates a bar code label with that patient's identification number on it. This label is then manually applied to the patient box and the box is placed on the conveyor. If no patient is registered in the room, the box is placed aside and the operator proceeds with the next patient box to be filled. Alternatively, empty, or non-labeled, patient boxes may be used. Once processing is started, a patient label containing the patient name, ID, and location is printed for every patient requiring filled, or for every patient (depending upon the configuration). Patient ID numbers uniquely identify the patient to the system. The operator must remove any old ID label and replace it with the new ID label. The box can then be loaded onto the conveyor. If the admission, discharge, and transfer (ADT) information conflicts with the fill information at this time, the operator will resolve the problem prior to delivery. Patients with orders that meet the operator's selection criteria are filled. When the turn comes for the patient box 26 to be filled, it is shuttled into a position on the conveyor 24 such that the automated picker 18 has access to the box 26 via the transfer device 22, as shown in FIG. 1. The transfer device 22 is provided to direct the packages 32 selected by the automated picker 18 into the patient box 26. The transfer device 22 has a predetermined unique (r,θ,Y) coordinate location. A stationary bar code reader 28 reads the bar code on the patient box 26. The patient identification number is then parsed from the bar code input. This causes the fill list for that particular patient to be retrieved from the database as indicated in box 185. The fill list is converted to data consisting of locations and number of picks. At box 187 the data is then downloaded to a robot controller or gantry control program in order for the computer 88 to control the automated picker 18 such that it knows what packages 32 to obtain and place in the patient box 26.

The system is now ready to pick the drugs 188. First, the picker assembly 18 rotates to the proper θ coordinate as directed by the computer 88. Next, the automated picker 18 moves vertically along the column 16 to the Y coordinate of the medicine package to be picked. Then the automated picker extends to the proper distance "r" to access the package 32.

When the end of gripper assembly 20 is properly positioned, the bar code reader 68 reads 190 the identity 52 on the medicine package 32 in order to confirm that it is the proper medicine package to be picked with respect to the patient's order. After such confirmation the suction bracket 84 extends in the "r" direction by pneumatic cylinder 85 such that the outside suction face 62 contacts the package face 59. Valve 80 activates a suction through the air lines 86 such that a suction drawn through the suction face 62 grabs the medicine package 32 sensor 82a detects when the contact is proper between the suction face 62 and the medicine package 32, as indicated at box 192 of FIG. 10. Then the extension bracket 84 retracts from the rod 34 of the support structure 38, pulling the medicine package 32 with it. Once the medicine package 32 is clear of the rod 34, the extension bracket 84 positions the medicine package 32 that it has obtained, upon the storing rod 66 as indicated by box 193.

The system now prepares for the next pick. This operation is indicated by box 194 includes several actions. Once the package 32 is on the storing rod 66, the vacuum valve 80 terminates the suction and the medicine package is released from the suction face 62. The vacuum valve 76 then activates the cylinder 83 such that the extension bracket 84 (and cylinder 85) are moved in the Y direction so the bottom of the suction head 70 is above the package 32 on the storing rod 66. The extension rod is then moved forward in the "r" direction and downward in the Y direction by the respective valves and cylinders to clear the package and position the suction head 70 for the next pick. In an alternative embodiment the storing rod 66 is moved down rather than moving suction head 70 up to provide clearance between them when the suction head moves in the "r" direction. The computer 88 then notes that the medicine package 32 with the appropriate medicine has been picked. The final series of operations indicated by boxes 195 through 202 involves a comparison of the drug identified by the reader as having been picked with the list of drugs to be selected. If an incorrect drug was selected, the gripper assembly 20 moves to a reject area, places the incorrect drug there, removes that drug from the list of items selected and is ready to pick more drugs. If the correct drug was selected, the system records that fact and is ready to pick more drugs. The process is repeated for all the medicine identified in the patient's order until all of the medicine packages 32 needed have been picked. The gripper assembly 20 containing all desired packages then positions itself in line with the transfer device 22. The gripper assembly 20 then positions the pusher plate 76B behind the packages 32 on the storing rod 66 that have been collected. Packages 32 are then deposited onto a storing rod on the transfer device 22 which delivers the packages 32 into the patient boxes 26 on conveyor 24, as shown most clearly in FIG. 6.

In the event that the wrong medicine package 32 was scanned and is picked, or the medicine has expired, then automated picker 18 will have placed those packages in a reject or return area, where the medicine package 32 can be disposed. A pharmacy technician will then manually sort the drugs in the reject area, removing expired drugs and placing the others in the supply rack in order that they might be returned to their correct location in the system.

Figure 11:
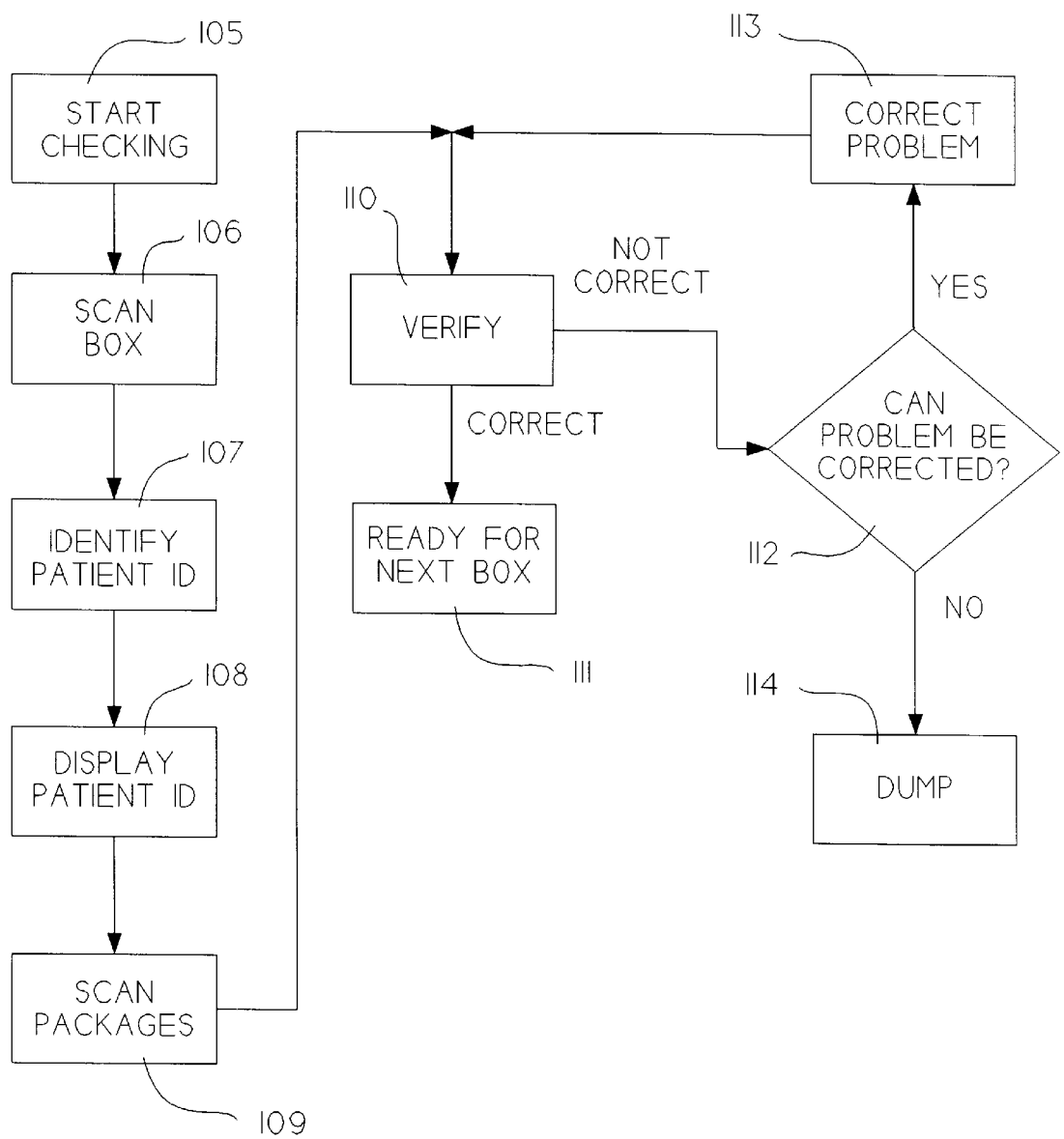
FIG. 11 is a flowchart of the check process.

The flow chart of FIG. 11 is the process of checking the selected packages which have been placed in a patient box. Such checking is performed at the check station. The process begins by calling up the check program indicated by box 105. The bar code on the patient box is scanned 106 and the patient number portion of the bar code is identified 107. The patient number is displayed 108 on the screen at the check station. Then the packages in the patient box are scanned 109. The identification of the packages is compared with the list of drugs that had been ordered for the patient in a verify step 110. If correct packages are in the box, the checking of the box is complete and the system is ready for the next box 111. If the packages in the box do not match the order, the system determines if the problem can be corrected 112. If so, the correction is made 113 and the verify step is repeated. If not, the box is dumped 114 and the order is recorded as not filled or the box is resubmitted and the missing medications are filled by the system. For example, should the system determine that an item is missing, it may either create a modified list and send the box on with a modified list or it may instruct the automated picker to get the missing item.

Figure 12:
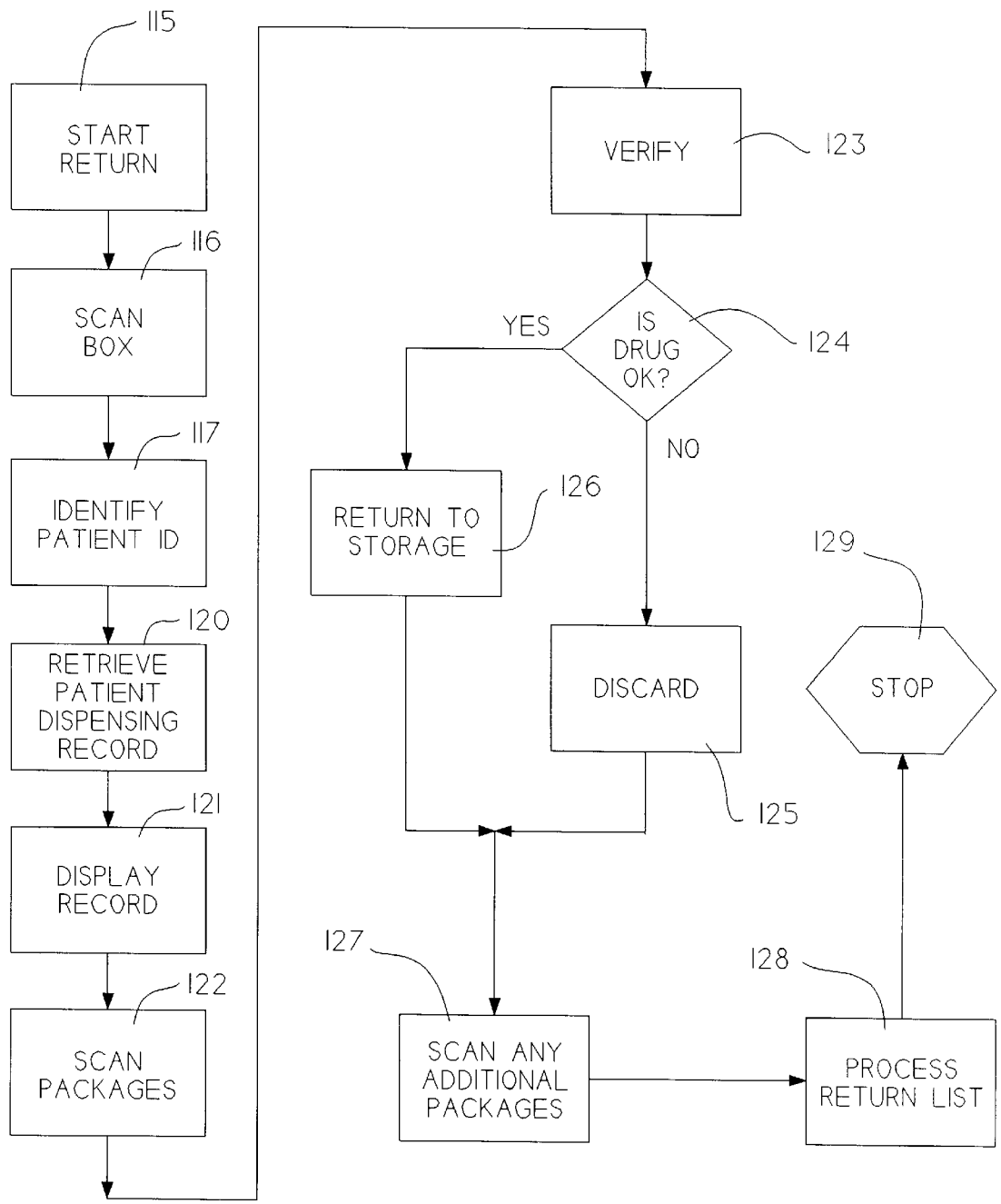
FIG. 12 is a flowchart of the return process.

The return process is shown in the flow chart of FIG. 12. The process starts 115 by calling up the return program. The patient box containing the returned items must be positioned so that the patient box can be scanned 116 for the patient identification number 117. Next, the packages are scanned 122. The system preferably verifies 123 that the scanned packages had been sent to the patient making the return. Next, the system checks each package 124 to determine if the drug is useful or if it has expired, been recalled or otherwise should not be returned to the supply rack. If no, the package is discarded 125. If yes, the package is returned to the supply rack 126. If more drugs remain in the box, the process is repeated 127. If no packages remain, the system may further process the list of returned packages 128 to modify the patient's record, update the system inventory log or display the list of returns for review by the operator.

Figure 13:
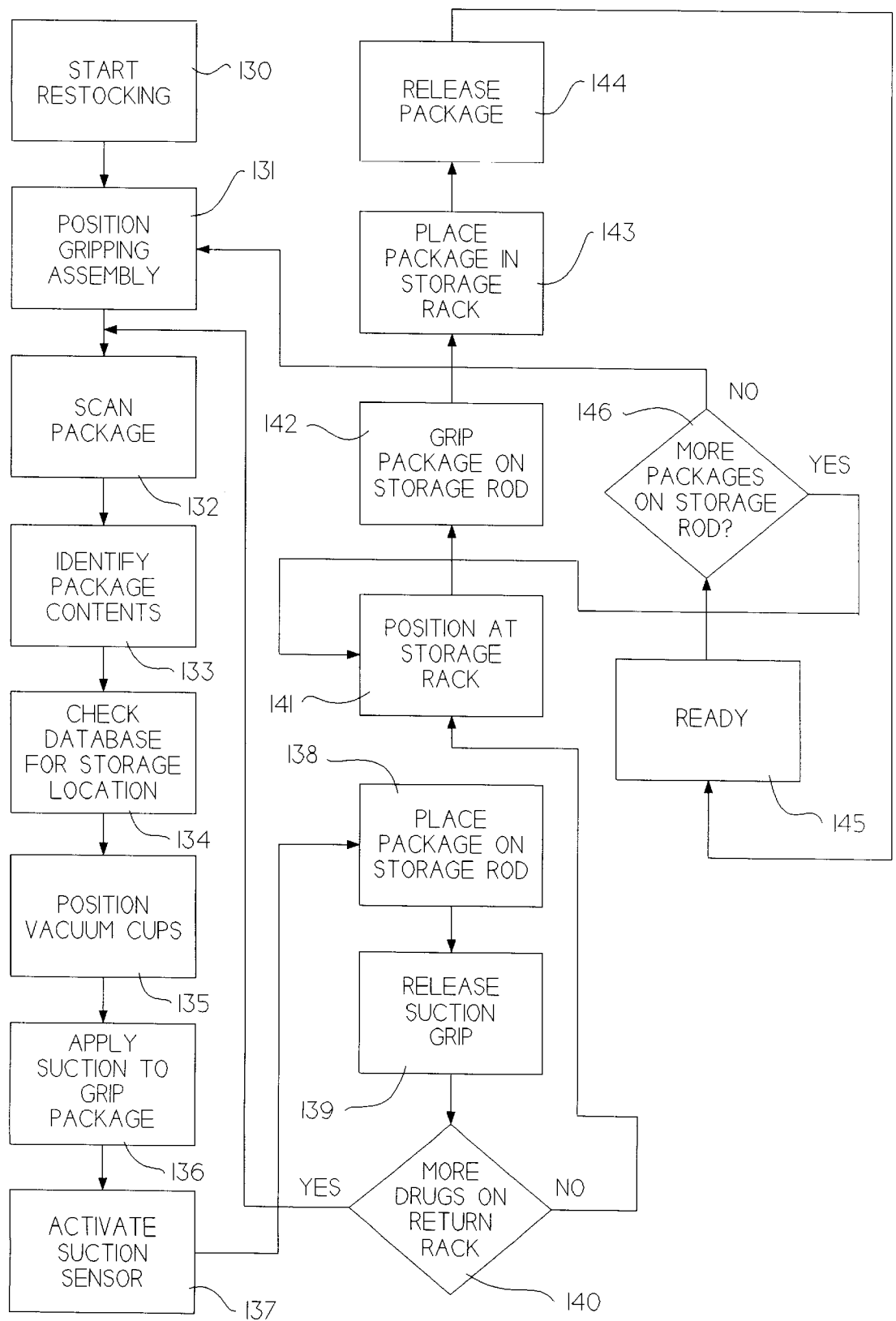
FIG. 13 is a flowchart of the restocking process.

The process of restocking returned or new packages to the storage rack 12 is diagrammed in FIG. 13. These packages are manually placed on a removable storage rack 12a and the program for restocking is called up 130. The program causes the automated be positioned 131 so that the gripping assembly 20 can pick packages 32 from the removable storage supply rack 12a. The bar code on the first package is scanned 132 and the portion of the scanned bar code which identifies the drug is found 133. The system then checks the database 134 for the location in the storage rack which has been designated for the identified product. The system extends the vacuum head 135 to engage the package. Suction is applied 136 and a suction sensor is checked. This should cause the package 32 to be held by the gripper assembly 20 which fact will be confirmed by the sensor 137. The gripper assembly 20 positions 138 the package 32 on the storing rod 66 in the gripper assembly 20. Then the suction is released and the gripper assembly 20 is ready to place additional packages 32 on the storing rod 66. If more packages remain on the removable storage rack 140, the process is repeated until all packages 32 are on the storing rod 66 or the storing rod is full. The gripper assembly 20 is then moved to a position 141 in front of the storage rack 12 to properly place the outermost package on the storing rod 66. That package is grasped 142 using back suction cups 64 (see FIG. 9). The extension bracket 84 is retracted in the negative "r" direction such that the inside suction face 64 is in contact with the medicine package 32. The sensing means 82 determines whether proper contact is made. Then the extension bracket 84 is moved a predetermined distance in the positive "r" direction 143 to place the medicine package 32 over a rod 34 of support structure 38. Vacuum valve 80 is then deactivated 144 to stop suction, allowing the medicine package 32 on the suction face 64 to drop away therefrom. The extension bracket 84 then moves in the negative "r" direction towards the medicine packages 32 on the storing rod 66 to repeat the process. While it moves back to obtain another medicine package 32, the sensor 82 trips when contact is made. The process can be repeated 141 until there are no more medicine packages 32 on the storing rod 66. The computer 88 knows when to stop returning packages since it knew how many packages had been placed on the storing rod 66. When all of the packages needed to fill the order have been selected the automated picker 18 and gripper assembly 20 deposit the packages 32 which have been selected onto a transfer device 22 which then delivers the packages 32 into the patient boxes 26 which are carried on conveyor 24, as shown in FIG. 6.

In the event that all drugs to be returned or restocked at a particular storage location are identical, the process is some what different. Packages are picked from the removable storage rack 12a in the method detailed above. The gripper assembly 20 is then moved to a position in front of the storage rack 12 to place the remaining packages 32 on the storing rod 66. Cylinder 66A causes the assembly of storing rod 66 and pusher plate 76B to move in the negative "r" direction. Storing rod 66 is co-linear with a rod 34 of support structure 38. Pusher plate 76B then moves in the positive "r" direction, pushing all remaining packages 32 on storing rod 66 on to rod 34.

The restocking of the storage racks 12 can be carried out during the evening when packages are not being gathered to fill orders.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A system for selecting and delivering packages to fill orders comprising:

a) a generally cylindrical storage area comprised of a plurality of storage area locations, each said location having package holders sized and configured to hold a plurality of individual packages in a manner such that each package can be placed into and removed from said locations, each said location having a distinct (r,θ,Y) coordinate;

b) a picker sized and configured to be able to hold packages, select packages from said storage area locations, and place packages in said storage area locations in accordance with computer controlled instructions, said picker having a gripper for grasping and moving the packages and having a picker storage holder sized and configured to hold a plurality of packages in a face to face relationship after the packages have been retrieved from said storage area and prior to delivery of the packages to a desired destination separate from said picker;

c) means for moving said picker to selected storage locations;

d) a computer having at least one memory which contains a program for directing said picker to chosen storage area locations and a database containing at least one (r,θ,Y) coordinate location in said storage area for each package held within said storage area, said computer being connected to said picker and said means for moving said picker.

2. The system of claim 1 further including a machine readable label provided on each package, which identifies a content of each package, and a package reader associated with said picker and being positioned for reading said label on at least one package located within said storage area location without removing the package, wherein only packages having like content are stored in each (r,θ,Y) coordinate location.

3. The system of claim 2 wherein said label is a bar code and said package reader is a bar code reader.

4. The system of claim 2 wherein said label also contains an expiration date.

5. The system of claim 1 wherein said gripper is a vacuum head.

6. The system of claim 1 also comprising a sensor attached to said picker for determining when the package is grasped by said gripper.

7. The system of claim 1 wherein said picker contains a picker storage holder for holding a plurality of packages selected by said picker.

8. The system of claim 7 wherein said picker storage holder is comprised of at least one storing rod and holes are provided in the packages to permit the packages to be held on said storing rod.

9. The system of claim 1 wherein the storage area is comprised of a plurality of storage racks, said storage racks having a shape corresponding to a section of said generally cylindrical storage area said storage racks each having a plurality of locations, each said location having package holders sized and configured to hold at least one of said plurality of individual packages in a manner such that the package can be placed into and removed from said locations by said picker, each location having a distinct (r,θ,Y) coordinate.

10. The system of claim 9 wherein at least one storage rack is removably positioned integral to said generally cylindrical storage area.

11. The system of claim 1 wherein said package holders in said generally cylindrical storage area are comprised of a plurality of rods and a hole is provided in each package to permit the package to be held on said rods.

12. The system of claim 1 also comprising at least one communication port attached to said computer through which a list of packages to be selected can be input and a list of packages selected by the system can be output.

13. The system of claim 1 wherein said memory contains a program for checking compatibility of products in packages selected by said picker with products listed in said database.

14. The system of claim 1 also comprising a conveyor in communication with a transfer device, said transfer device in communication with said picker.

15. The system of claim 14 also comprising a plurality of containers positioned on said conveyor, said containers being sized and positioned to receive packages from said transfer device, said transfer device being positioned to receive said packages from said picker and direct said packages into said containers conveyor.

16. The system of claim 15 wherein said containers have machine readable labels.

17. The system of claim 16 wherein said labels are bar codes.

18. The system of claim 15 also comprising a check station located adjacent said conveyor, said check station having a reader for reading said machine readable labels.

19. The system of claim 18 wherein said reader is connected to said computer in a manner to input information from said machine readable labels; said computer having a program for storing the input information in said memory and for comparing the input information to other information contained in said database.

20. The system of claim 1 wherein the packages contain individual doses of medicine.

21. The system of claim 1 wherein said picker includes at least one gripper that picks the packages; at least one column on which said picker is supported, said picker being able to rotate 360° on said column to pick packages from selected storage locations, which locations are positioned at (r,θ) points along the circumference of said storage area, said picker movable vertically along said column by said moving means and said moving means controlled by said computer and in communication therewith.

22. A system for selecting and delivering medicine packages from a holding area to fill orders comprising:
a) a holding area comprised of a generally cylindrical frame having a plurality of support rods, each said support rod sized for holding a plurality of medicine packages, each said support rod also associated with a specified medicine package and holding only like medicine packages, each said support rod further having a distinct (r,θ,Y) coordinate location;

b) a picker for picking the medicine packages from said support rods in accordance with instructions received from a computer, said picker being able to access said holding area, said picker also capable of holding a plurality of said medicine packages which have been picked from said holding area;

c) a computer having a database containing an (r,θ,Y) coordinate location for all packages in said holding area, said computer able to receive orders for the packages and direct said picker; and d) a supply structure having a shape corresponding to a section of said generally cylindrical frame, said supply structure further having a plurality of supply support rods which extend from said supply structure to form an (r,θ,Y) coordinate system, with each said supply support rod, and medicine package thereon, having a unique (r,θ,Y) coordinate, said picker disposed to have access to said supply structure such that a given medicine package on an associated one of said plurality of supply support rods can be picked by said picker to fill a patient's order, or a given medicine package in said supply structure can be picked by said picker to restock an associated support rod in said holding area.

23. The system of claim 22 also comprising a conveyor in communication with a transfer device, said transfer device in communication with said picker, and patient order boxes on said conveyor, such that said picker provides the medicine packages it has picked to fill a given order to said transfer device which directs the medicine packages into an associated one of said boxes on said conveyor.

24. The system of claim 22 wherein said picker comprises at least one gripper that picks said medicine packages; at least one column on which said picker is supported, said picker being able to rotate 360° on said column to pick a given medicine package hanging from a corresponding support rod, to restock a given medicine package on a corresponding support rod; and means for moving said picker vertically along said column, said moving means controlled by said computer.

25. The system of claim 24 wherein each medicine package is provided with a machine readable label, and wherein said picker comprises:

a) a housing;

b) a picker storage holder for storing a plurality of medicine packages attached to said housing;

c) means for obtaining the medicine package, said obtaining means slidingly attached to said housing such that it can move in the "r" direction, which is perpendicular to the Y direction, to pick a medicine package from said support rod when said housing is adjacent to and aligned with said support rod, and can move in the "r" direction to place a picked package on said picker storage holder; and d) a reader attached to said at least one gripper such that it can read said label on a package to be picked by said obtaining means.

26. The system of claim 25 wherein said label is a bar code, and said reader includes a bar code reader.

27. A system for selecting and delivering packages from a holding area to fill orders comprising:

a) a generally cylindrical holding area having a plurality of support rods for holding packages, each said support rod having a distinct radial, angular and vertical coordinate location and holding a plurality of packages, all packages on each said support rod having the same contents;

b) a picker for picking packages from said support rods in accordance with instructions received from a computer, said picker being able to access said generally cylindrical holding area, said picker comprising:

i) a housing;

ii) a picker storage holder attached to said housing for storing packages;

iii) means for producing a suction;

iv) a suction rod and a suction head in fluid connection with each other and with said suction producing means, said suction rod slidingly attached with respect to the vertical and radial directions to said housing, said suction head maintaining a suction therethrough when said suction producing means is activated, by which a medicine package is picked with suction; and v) sensor for sensing when a package is properly positioned such that said suction head is then moved to said picker storage holder and deposits the package thereon.

28. The system of claim 27 also comprising a conveyor in communication with a transfer device, said transfer device in communication with said picker, and patient order boxes on said conveyor, such that said picker provides the medicine packages it has picked to fill a given order to said transfer device which directs said medicine packages into an associated one of said boxes on said conveyor.

29. The system of claim 27 wherein said picker storage holder is a storing rod which extends from said housing such that said suction head can deposit a package thereon.

30. The system of claim 28 wherein said picker further comprises valves and pneumatic cylinders for moving said suction rod in the vertical and radial directions; and a vacuum pump for providing suction to said suction rod and suction head sufficient to pick a package from said support rod and then hold it to said suction head.

31. The system of claim 29 wherein said suction head has two faces through which a suction can be drawn, each said face capable of picking a package.

32. The system of claim 31 wherein said two faces are parallel to each other and wherein each package has at least one package face and the packages are held by said storing rod and support rods such that said package face of is parallel to a face of said suction head when said suction head is positioned in front of said package.

33. The system of claim 25 also comprising a support rod sensor attached to said housing and adapted to sense said support rods and said supply support rods when said rods are in proximity to said picker.

34. The system of claim 29 wherein said storing rod is hollow and has at least one aperture therein near to an end for receiving said packages deposited thereon by said suction head, and further comprising a compressed air source connected to said hollow storing rod for providing compressed air into said hollow storing rod and out said at least one aperture.

* * * * *